United States Patent Office 3,060,373
Patented Oct. 23, 1962

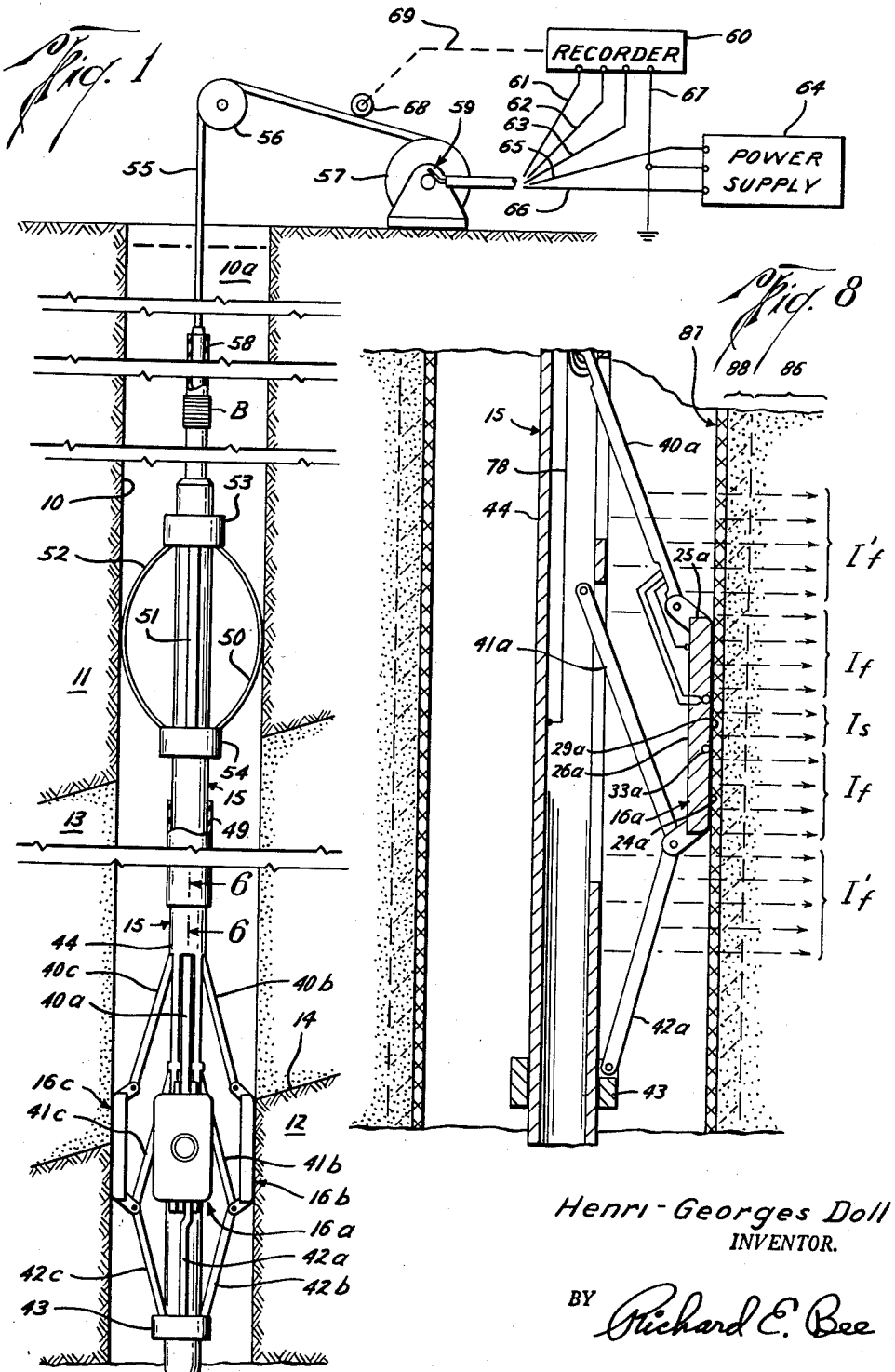

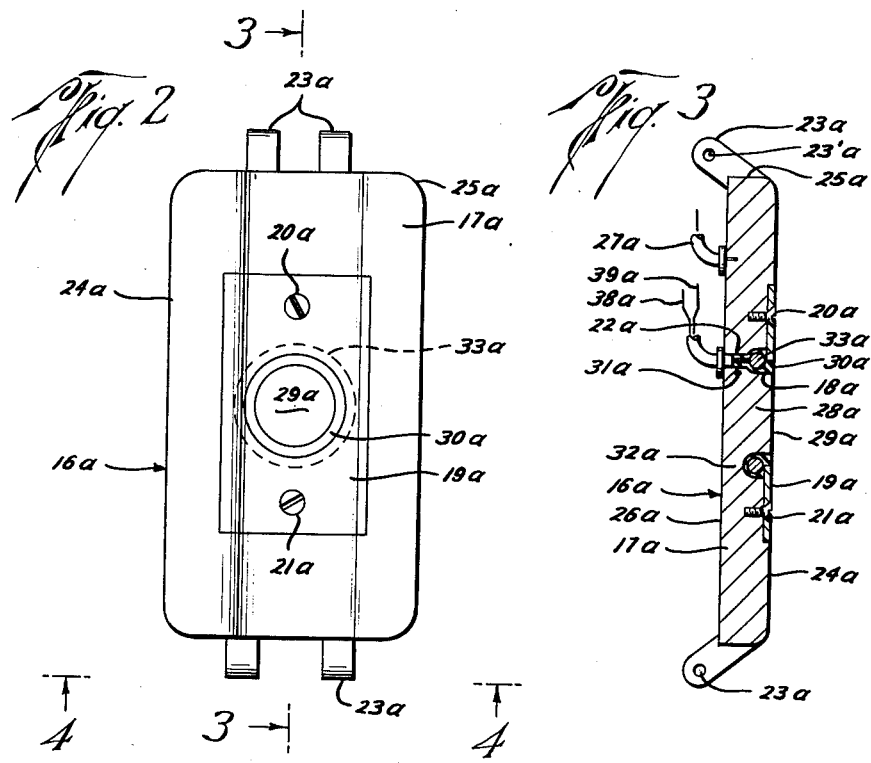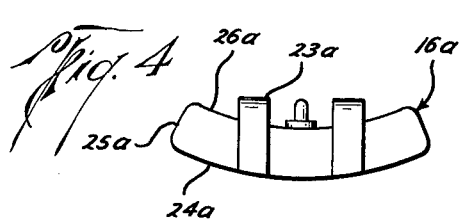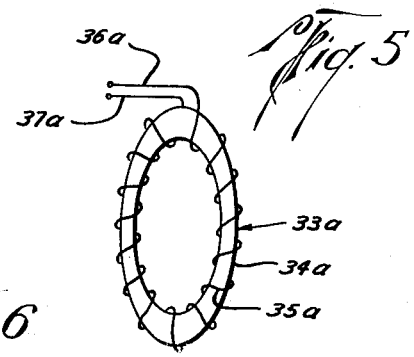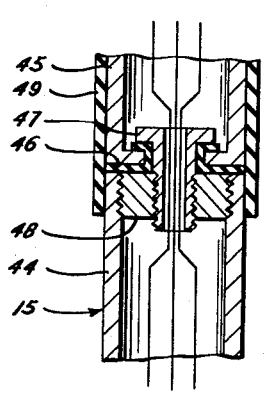
Henri-Georges Doll
INVENTOR.
BY Richard E. Bee
ATTORNEY

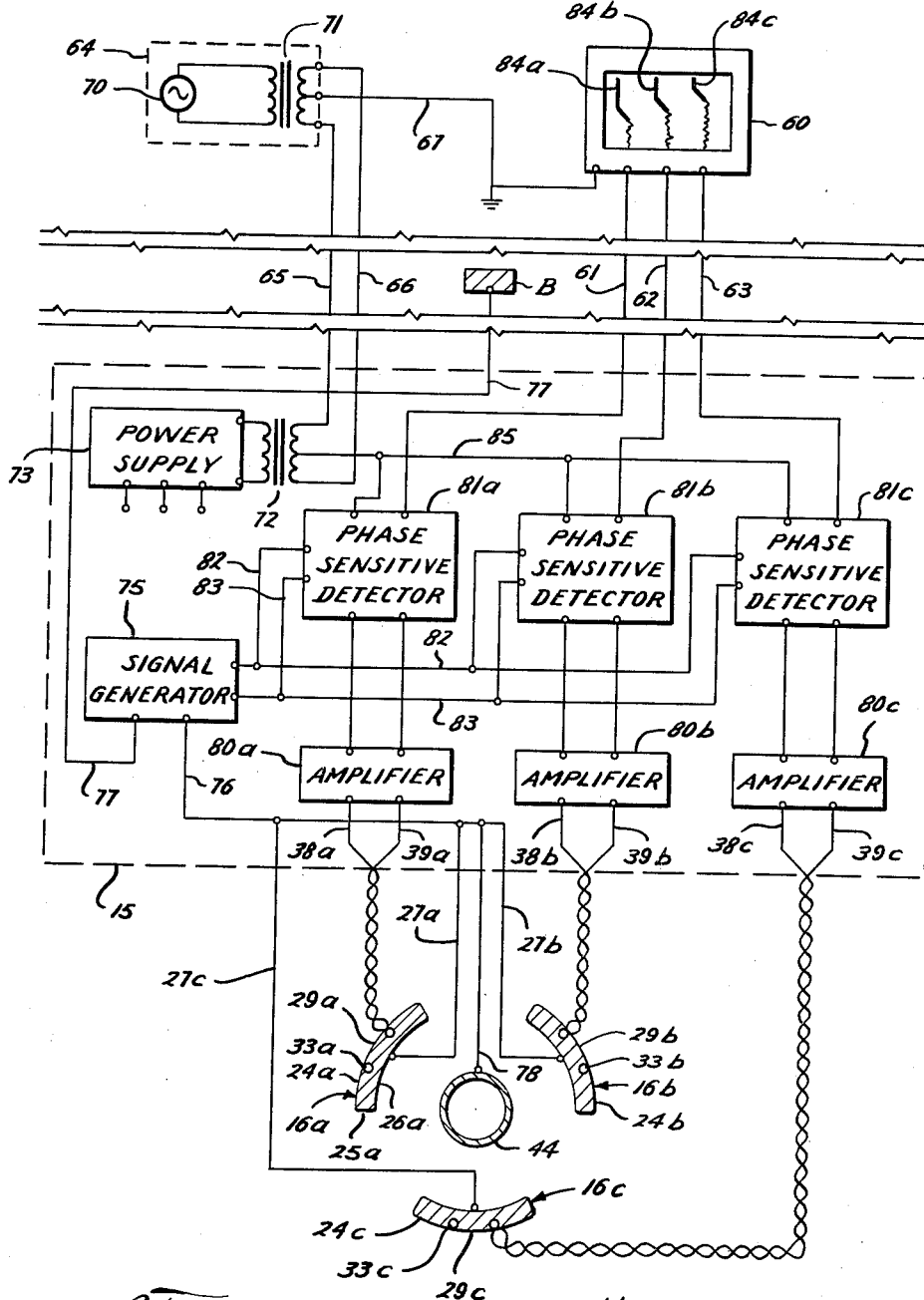

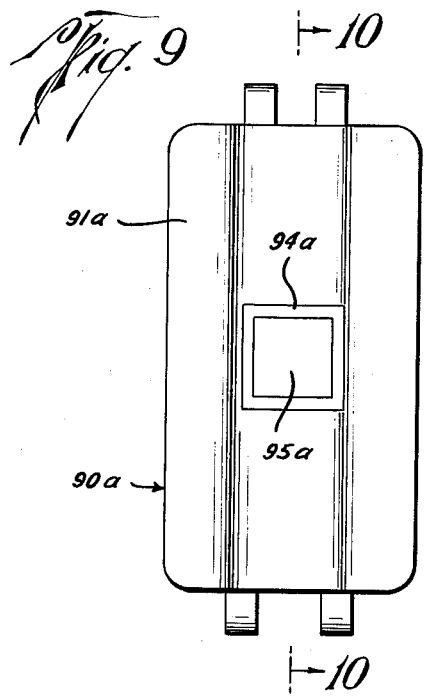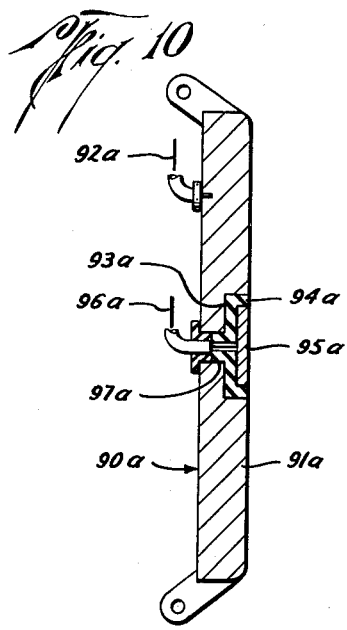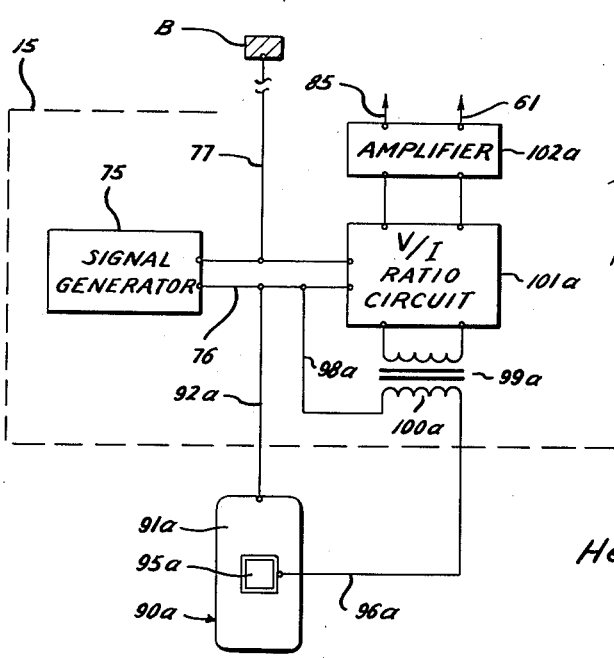

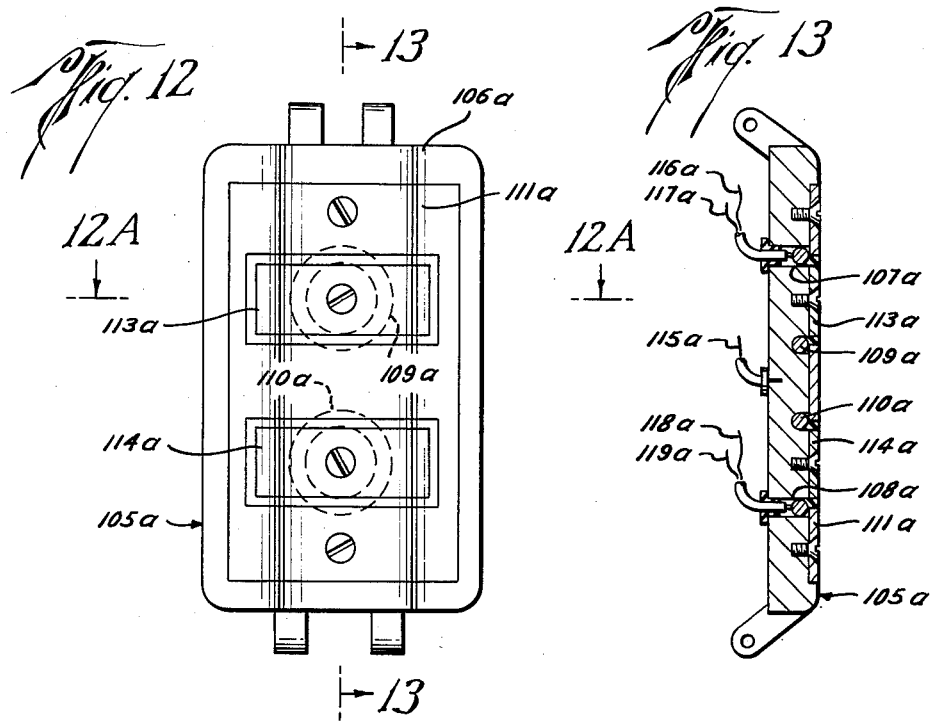
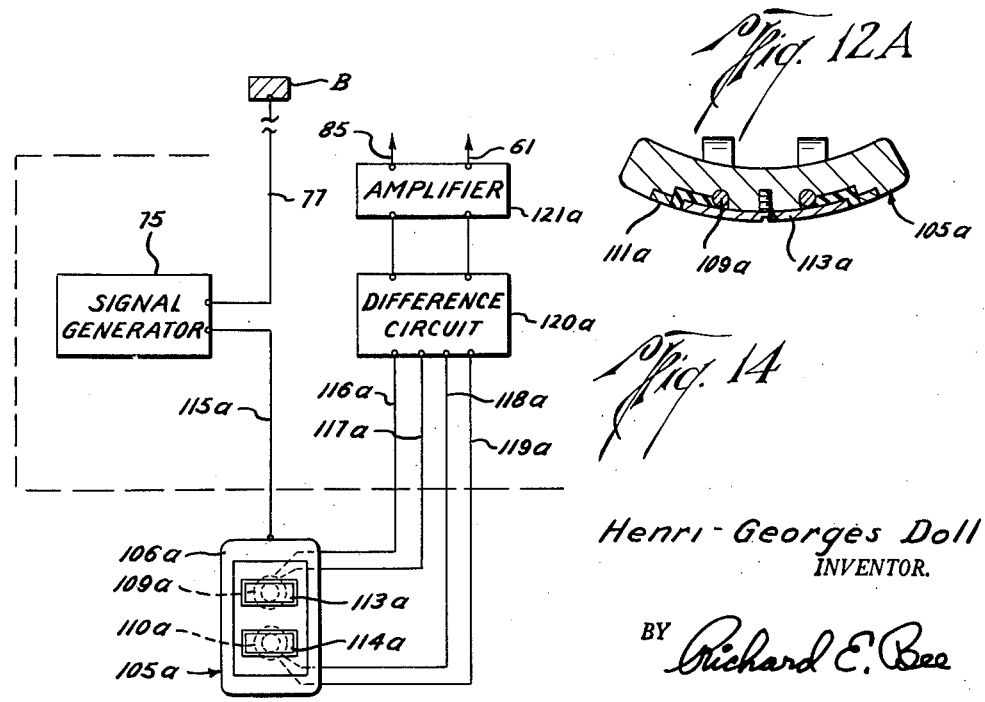

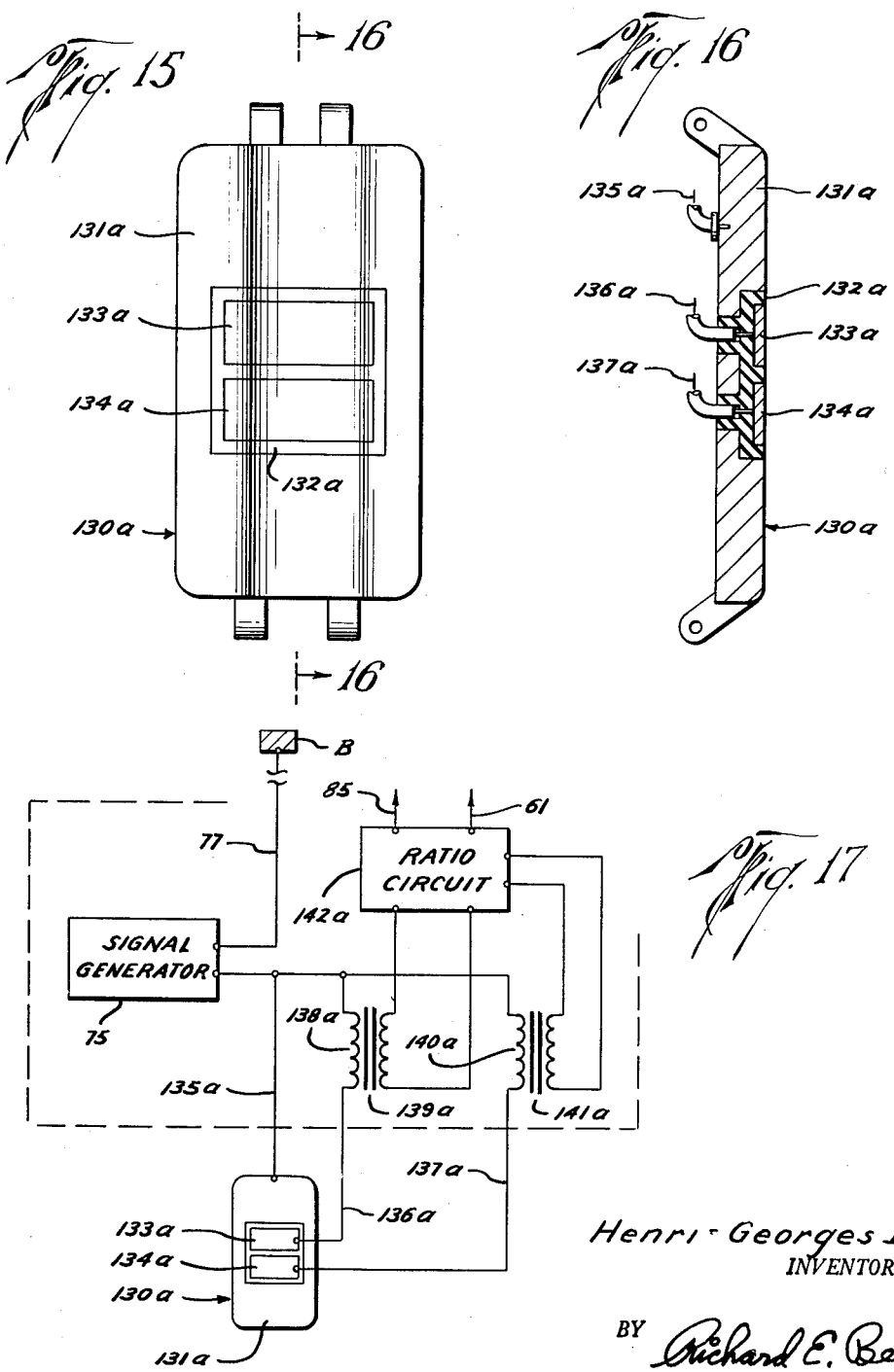

3,060,373
APPARATUS FOR INVESTIGATING
EARTH FORMATIONS
Henri-Georges Doll, Ridgefield, Conn., assignor to
Schlumberger Well Surveying Corporation, Houston,
Tex., a corporation of Texas
Filed June 16, 1959, Ser. No. 820,821
44 Claims. (Cl. 324—1)

This invention relates to electrical apparatus for investigating subsurface earth formations traversed by a bore-hole and, particularly, to such apparatus of the type wherein measurements of the electrical resistance properties of subsurface earth formations are made by moving a system of electrodes through a borehole.

It has become common practice to obtain records or logs of the resistivity or conductivity values of the earth formations adjacent a borehole drilled into the earth by moving a system of electrodes through the borehole and determining the resistance presented by the earth formations to the flow of electrical current emitted from one or more of the electrodes. An electrical log obtained in this manner aids in determining the nature and lithological character of the various subsurface formations. This information is particularly useful in the case of oil well boreholes in that it enables the presence and depth of any oil or gas-bearing strata to be determined.

A problem is sometimes encountered in the electrical logging of earth formations in that it is sometimes difficult to get the electrical current to flow into the uncontaminated portions of the earth formations in the desired manner. This is particularly likely to occur adjacent a permeable earth formation where filtrate from the drilling mud has invaded the formation to an appreciable extent and a mud cake of appreciable thickness has built up on the wall of the borehole. To alleviate this difficulty, so-called "focussed" electrode systems have been heretofore proposed. In these focussed systems, the principal current flow used for determining or surveying the formation resistance characteristics is constrained to the desired flow pattern by emitting focussing current adjacent thereto for opposing any surveying current tending to flow in an undesired direction. In this manner, the surveying current may be caused to penetrate laterally into the earth formations for an appreciable distance.

It is also frequently desirable to determine the dip angle of the boundary between two adjacent earth formation regions having different resistivity or conductivity characteristics and to determine the direction of such dip. This information adds further knowledge as to the character of the subsurface formations and aids in the selection of locations for new wells or boreholes. To this end, so-called "dipmeter" apparatus has been heretofore proposed. One such form of apparatus employs three sets of electrodes to measure the resistivity of the formations at three circumferentially spaced locations around the wall of the borehole. If the resistivity changes recorded for the three sets of electrodes occur at different borehole depths, then this indicates the departure of the boundary plane from a right angle relation with respect to the borehole axis. For a perfectly vertical borehole, this represents the departure of the boundary plane from a horizontal position. The magnitude and direction of this dip is determined from the magnitudes of the differences in depth levels at which the same resistivity change occurs for the three sets of electrodes.

It is an object of the invention to provide new and improved apparatus for measuring the electrical resistance properties of earth formations adjacent a bore hole.

It is another object of the invention to provide a new and improved electrode system which is less affected by the presence of any mud cake on the borehole wall.

It is a further object of the invention to provide a new and improved electrode system having a greater depth of lateral penetration under adverse conditions.

It is an additional object of the invention to provide a new and improved electrode system which is less sensitive to irregularities and variations in borehole diameter.

It is another object of the invention to provide a new and improved wall contact type of electrode system which is less sensitive to variations in the degree of contact with the borehole wall.

It is a further object of the invention to provide a new and improved wall-engaging electrode pad having a more rugged form of construction.

It is yet another object of the invention to provide new and improved dipmeter apparatus for measuring the dip angle of the boundary between adjacent earth formation regions having different resistivity characteristics.

It is a still further object of the invention to provide new and improved dipmeter apparatus which is less affected by circumferential variations in the thickness of any mud cake on the borehole wall.

In accordance with one feature of the invention, a borehole wall-engaging member for investigating earth formations adjacent a borehole comprises first electrode means for emitting current from the wall-engaging face of the member and second electrode means for emitting current from the edge of the member. The wall-engaging member also includes means electrically interconnecting the first and second electrode means.

In accordance with another feature of the invention, apparatus for investigating earth formations traversed by a borehole comprises a pad member adapted to be urged against the borehole wall. The apparatus also includes a first electrode forming part of the pad member and having a surface portion located on the wall-engaging face thereof. The apparatus further includes a second electrode forming part of the pad member and having a first surface portion located on the wall-engaging face and a second surface portion located on the edge of the pad member. The apparatus also includes circuit means for energizing the electrodes for emitting electrical currents from the surface portions thereof. The apparatus additionally includes means responsive to the flow of at least one of these currents for providing indications representative of formation resistivity.

For a better understanding of the present invention, together with other and further objects thereof, reference is had to the following description taken in connection with the accompanying drawings, the scope of the invention being pointed out in the appended claims.

Referring to the drawings:

FIG. 1 illustrates a representative embodiment of borehole investigating apparatus constructed in accordance with the present invention;

FIG. 2 is an enlarged elevational view of one of the electrode pads of FIG. 1;

FIG. 3 is a cross-sectional view of the electrode pad of FIG. 2;

FIG. 4 is a top view of the FIG. 2 pad;

FIG. 5 is a perspective view of a representative form of toroidal coil which may be incorporated in the electrode pad of FIG. 2;

FIG. 6 is a cross-sectional view of a portion of the FIG. 1 apparatus taken along the section line 6—6 thereof;

FIG. 7 is a schematic circuit diagram of electrical circuits which may be used with the FIG. 1 apparatus;

FIG. 8 is an enlarged cross-sectional view of a portion of the borehole and apparatus shown in FIG. 1;

FIGS. 9 and 10 are elevational and cross-sectional views, respectively, of a modified form of electrode pad which may be used with the apparatus of FIG. 1;

FIG. 11 is a schematic circuit diagram of electrical circuits which may be used with the modified electrode pad of FIGS. 9 and 10; FIGS. 12, 12A and 13 are elevational top and cross-sectional views, respectively, of a further form of electrode pad which may be used with the apparatus of FIG. 1;

FIG. 14 is a circuit diagram of electrical circuits which may be used with the electrode pad of FIGS. 12 and 13;

FIGS. 15 and 16 are elevational and cross-sectional views, respectively, of a further form of electrode pad which may be used with the apparatus of FIG. 1; and FIG. 17 is a circuit diagram of electrical circuits which may be used with the electrode pad of FIGS. 15 and 16.

Referring to FIG. 1 of the drawings, there is shown a representative embodiment of apparatus constructed in accordance with the present invention for investigating earth formations traversed by a borehole 10. The borehole 10 is filled with a conductive drilling fluid or drilling mud 10a. Typical earth formations are represented by shale formations 11 and 12 and an intervening sand formation 13. While many of the novel features of the present invention are of general utility in making borehole measurements, apparatus constructed in accordance with the present invention is particularly useful for investigating the dip angle of boundaries between adjacent earth formation regions traversed by the borehole 10. A typical boundary is represented by a boundary 14 between the adjacent earth formations 12 and 13. The features of the present invention, therefore, will be described for the case of dipmeter apparatus for measuring such dip angles. With this in mind, the apparatus of FIG. 1 includes an elongated support member or instrument housing 15 adapted for movement through the borehole 10. The apparatus of FIG. 1 additionally includes three pad members or electrode pads 16a, 16b and 16c, each of which is to be urged against the wall of the borehole 10.

Referring now to FIGS. 2, 3 and 4 of the drawings, there are shown front, elevational, cross-sectional and top views of the electrode pad 16a of the FIG. 1 apparatus. FIG. 2 shows the wall-engaging face of the pad 16a. As seen in these figures, the electrode pad 16a is formed of an electrode means or electrode member for emitting various electrical currents into the adjacent earth formation. From an electrical standpoint, the electrode pad 16a includes two principal electrode parts, the first of which is a focussing current electrode means for emitting focussing current both into the adjacent earth formations and into the drilling mud 10a. This focussing current electrode includes a metal pad 17a which, from a mechanical standpoint, comprises the major portion of the electrode pad 16a. There is cut into a central portion of the wall-engaging face of this metal pad 17a an annular recess 18a. This recess is partially covered by a cover plate 19a secured to the metal pad 17a by means of screws 20a and 21a. A small cylindrical passageway 22a communicates between the annular recess 18a and the backside of the metal pad 17a. Ears or lugs 23a are formed at the top and bottom of the metal pad 17a for enabling mechanical coupling to the instrument housing 15. Each of the lugs 23a includes a horizontal passageway 23'a therethrough into which a suitable pivot pin may be placed. The main pad portion 17a, the cover plate 19a, the screws 20a and 21a and the lugs 23a are constructed entirely of metal, such as iron or steel, having metal-to-metal contact with one another to make up the focussing current electrode.

In this manner, it is seen that the focussing current electrode includes a surface portion 24a located on the wall-engaging face of the electrode pad 16a, which surface portion 24a defines a path encircling the central region of the pad 16a. This surface portion 24a extends to and forms the edge of the electrode pad 16a, the edge surface portion being indicated by the reference numeral 25a. This edge surface portion 25a is likewise seen to completely encircle the central portion of the electrode pad 16a. In addition, the focussing current electrode includes a further surface portion 26a covering at least the outer peripheral area of the backside of the electrode pad 16a. In the illustrated embodiment, this surface portion 26a covers the entire backside of the metal pad portion 17a. Electrical connection to the focussing current electrode is made by way of an insulated conductor 27a, the end of which is soldered or welded into the backside of the metal pad portion 17a.

The second principal electrode part of the electrode pad 16a is a survey current electrode means forming part of the pad member 16a and having a surface portion located on the wall-engaging face of the pad 16a for emitting survey current therefrom. This survey current electrode is formed by electrode portion 28a of the metal pad 17a, which electrode portion 28a has a centrally-located surface portion 29a on the wall-engaging face of the pad member 16a. The survey current electrode surface portion 29a is, at the edge of this surface, electrically separated from the parts of the metal pad 17a making up the wall-engaging surface of the focussing current electrode by means of the annular recess 18a. This recess 18a is partially filled with insulating material 30a. It will be noted that the survey current electrode portion 28a forms a current conductive means extending from the wall-engaging face to the backside of the pad member 16a and having exposed surface portions on both the wall-engaging face side and the backside of this pad member 16a. This electrode portion 28a is constructed of the same material as is the remainder of the metal pad 17.

The electrode pad 16a also includes as part thereof low impedance means electrically connecting the focussing current electrode and the survey current electrode portions. These interconnecting means are formed in this embodiment of the invention by portions 31a and 32a of the metal pad 17a which portions are made of the same material as the remainder of the metal pad 17a. Thus, while the metal pad 17a is constructed as one integral piece, it nevertheless contains the electrically distinct focussing current electrode portion, survey current electrode portion and the portions electrically interconnecting these two electrode portions.

The electrode pad 16a of the present embodiment of the invention also includes a toroidal coil 33a forming part of the pad member 16a and encircling the survey current electrode portion 28a leading to the survey current surface portion 29a. A typical form of toroidal coil is shown in greater detail in FIG. 5 and, as there shown, includes a doughnut-shaped ferromagnetic core 34a having a coil winding 35a wound thereon. The ends of the winding 35a form lead wires 36a and 37a. This toroidal coil 33a is embedded in the wall-engaging face of the pad member 16a by locating it in the annular recess 18a. The cover plate 19a and the electrical insulation material 30a assist in retaining the coil 33a in place. Electrical connection to the toroidal coil 33a is made by means of a pair of electrically-insulated conductors 38a and 39a, shown in FIG. 3, which are electrically connected to the lead wires 36a and 37a shown in FIG. 5. These conductors 38a and 39a enter the backside of the metal pad 17a and pass through the cylindrical passageway 22a to the toroidal coil 33a as show in FIG. 3.

Each of the other electrode pads 16b and 16c of the FIG. 1 apparatus are identical in construction to the electrode pad 16a just discussed. Accordingly, corresponding reference numerals with the appropriate suffixes "b" and "c" will be used to indicate the various parts of the electrical pads 16b and 16c wherever necessary.

The apparatus of FIG. 1 also includes metal support means for coupling each of the pad members 16a, 16b and 16c to the support member or instrument housing 15 for enabling movement of the pad members through the borehole in unison and for urging the pad members against the borehole wall at three angularly spaced apart locations around the circumference of the borehole. For the electrode pad 16b, the metal support means includes the support arms 40b, 41b and 42b which are pivotally coupled between the electrode pad 16b and the housing 15, the support arms being pivotally pinned to the lugs 23b on the pad 16b. The lower end of support arm 42b is pivotally coupled to a slidable collar member 43. The other electrode pads 16a and 16c are coupled to the instrument housing 15 in a similar manner. Suitable actuating means are contained within the housing 15 for urging the upper support arms outwardly thereby to urge the electrode pads against the borehole wall. The interiors of the upper support arms 40a, 40b and 40c are hollow and the insulated electrical conductors from each electrode pad extend through the corresponding ones thereof to suitable electrical circuits contained within the interior of the instrument housing 15.

At least a portion of the support member or instrument housing 15 located adjacent the pad members 16a, 16b and 16c is constructed to have a conductive surface for emitting additional focussing current therefrom. To this end, the lower part 44 of the housing 15 is formed of a conductive metal and is electrically insulated from the upper part of the instrument housing 15 by means of a nonconductive insert or insulating member as shown more in detail in FIG. 6. As seen in FIG. 6, the lower portion 44 of the housing 15 is insulated from the upper portion 45 by means of an insulating member 46. A metal bolt member 47 serves to secure a metal nut member 48 to the upper housing portion 45. The lower housing portion 44 is then threadedly connected to the nut member 48 to thereby mechanically secure the lower portion 44 to the upper portion 45. The center bolt portion 47 is electrically insulated from the upper housing portion 45 by means of the insulating member 46 so that no direct electrical connection is made between the upper and lower portions by means of this member. The bolt portion 47 has a cylindrical passageway through the central region thereof through which may pass the various insulated electrical conductors which interconnect electrical circuits in the upper portion of the housing 15 with the various electrode and coil elements on the electrode pads 16a, 16b and 16c. The major portion of the instrument housing 15 above the insulating member 46 is preferably covered on the exterior thereof with electrical insulation material 49. In view of the foregoing construction, the lower portion of the instrument housing below the insulating member 46 may be energized to emit electrical current from the surface thereof, while at the same time the remainder of the instrument housing will not be electrically energized.

In addition to electrical circuits for operating the pad electrodes, there is also contained within the upper portion of the instrument housing 15 suitable inclinometer apparatus for measuring the direction and angle of any deviation of the borehole 10 from a true vertical axis. For sake of simplicity, this inclinometer apparatus is not shown in the drawings.

The apparatus of FIG. 1 also includes a suitable centering guide assembly coupled to the upper end of the instrument housing 15. Such centering guide assembly includes flexible spring arms 50, 51 and 52 which are connected to suitable collar members 53 and 54 at the extremities thereof. One of the collar members 53 and 54 is secured to the instrument housing 15 in a fixed manner while the other collar member is slidably mounted on the housing 15 to allow for expansion and contraction of the spring arms. It will be noted that the electrode pads 16a, 16b and 16c and the associated support arms at the lower end of the housing 15 also act as a centering guide to keep the housing 15 centered in the borehole.

The upper end of the instrument housing 15 is connected by means of an armored multiconductor cable 55 to suitable apparatus at the surface for raising and lowering the instrument housing through the borehole 10. To this end, the multiconductor cable 55 passes over a sheave 56 and thence to a suitable drum and winch mechanism 57. The first 100 feet or so of the multiconductor cable 55 just above the instrument housing 15 is covered with electrical insulation material 58. There is secured to the exterior of the insulation material 58 a suitable current-return electrode "B."

Electrical connection between the various conductors of the multiconductor cable 55 and the various electrical circuits at the surface of the earth is accomplished by means of a suitable multielement slip ring and brush contact assembly 59. In this manner, a multiunit recorder 60 at the surface of the earth is connected by way of conductors 61, 62 and 63, corresponding slip ring and brush contact elements and corresponding conductors in the multiconductor cable 55 to the various electrical circuits located in the instrument housing 15. In a similar manner, a surface power supply unit 64 is coupled by way of conductors 65 and 66, additional slip ring elements and additional cable conductors to the downhole circuits within the housing 15. A common ground interconnection for the surface equipment is formed by conductor 67.

Recorder 60 is of the multiunit galvanometer type having a recording medium such as photographic film which moves in synchronism with the movement of the downhole apparatus through the borehole. To accomplish this movement of the recording medium, a suitable measuring wheel 68 engages the cable 55 and is mechanically coupled as indicated by dash line 69 to a suitable drive mechanism for the recording medium of recorder 60.

Turning now to FIG. 7 of the drawings, there is shown in greater detail the various electrical circuits for operating the apparatus of FIG. 1. The various electrical circuits contained within the dash-line box 15 correspond to the electrical circuits which are included within the interior of the instrument housing 15 of FIG. 1. As seen in FIG. 7, the surface power supply unit 64 includes a source of alternating-current energy 70 having a frequency such as 60 cycles which is coupled by way of a transformer 71, cable conductors 65 and 66 and a downhole transformer 72 to a downhole power supply unit 73. The secondary winding of transformer 71 and the primary winding of transformer 72 are center-tapped to form a phantom-type ground-return circuit between the surface and downhole equipment, the surface equipment ground conductor 67 being connected to the center tap on transformer 71. The downhole power supply unit 73 is responsive to the alternating-current energy coming down the cable conductors 65 and 66 to develop the various operating voltages for the downhole electrical circuits. For sake of simplicity, the power supply interconnections between the downhole power supply 73 and the various other downhole circuits have been omitted.

The electrical circuits shown in FIG. 7 include circuit means for energizing the focussing current electrodes of each of the pad members 16a, 16b and 16c. To this end, the circuits of FIG. 7 include a signal generator 75 for generating an alternating-current output voltage or potential having a frequency such as 20 kilocycles. Signal generator 75 is coupled by way of a conductor 76 and the electrode pad conductors 27a, 27b and 27c to the metal pad portion of each of the electrode pads 16a, 16b and 16c. The other side of the signal generator 75 output is coupled by way of a conductor 77 to the current-return electrode B located on the insulating material around the lower end of the multiconductor cable 55 shown in FIG. 1.

The apparatus of FIG. 7 further includes circuit means for energizing the survey current electrode of each of the pad members 16a, 16b and 16c for emitting survey current from the surface portion 29a, 29b and 19c thereof. This survey current energizing circuit means for this embodiment of the invention includes the previously-mentioned signal generator 75 and the conductors 76, 27a, 27b, and 27c plus the portions of the metal pad members which interconnect the focussing current electrode portions with the survey current electrode portions.

The apparatus of FIG. 7 also includes circuit means for energizing the instrument housing conductive surface 44 for emitting focussing current from the surface thereof. This energizing means includes the signal generator 75, the conductor 76 and a conductor 78 which is connected to the interior of the housing portion 44 as shown in FIG. 8. The electrical circuits of FIG. 7 additionally include circuit means for energizing the metal support arms supporting the pad members from the instrument housing 15 for emitting further focussing current therefrom. This circuit means includes the previously-mentioned circuit means for the electrode pads 16a, 16b and 16c and the previously-mentioned circuit means for energizing the housing conductive surface 44 together with the electrical connections provided by the mechanical or metallic coupling of the metal support arms to both the electrode pads and the instrument housing portion 44.

The electrical apparatus of FIG. 7 further includes for each of the electrode pads 16a, 16b and 16c means responsive to the flow of at least one of the currents associated therewith for providing indications representative of formation resistivity. For the electrode pad 16a, this includes circuit means responsive to the signal developed by the toroidal coil 33a for providing the desired signal indication at the surface of the earth. To this end, the apparatus of FIG. 7 includes an amplifier 80a coupled to the toroidal coil 33a by way of conductors 38a and 39a. The amplified output signal from amplifier 80a is then supplied to a phase sensitive detector 81a. Also supplied to the phase sensitive detector 81a is an actuating phase reference signal from the signal generator 75. This actuating signal is coupled thereto by way of conductors 82 and 83. The resulting direct current output signal from the phase sensitive detector 81a is then supplied by way of conductor 61 of multiconductor cable 55 to the recorder 60 at the surface of the earth to develop on the recording medium a record or trace 84a. The other side of the phase sensitive detector 81a output is connected to a common ground conductor 85 which, together with the phantom ground-return circuit, serves to provide the ground-return circuit for the phase sensitive detector 81a output signal.

Each of the other electrode pads 16b and 16c has corresponding toroidal coils 33b and 33c thereof coupled by way of amplifiers 80b and 80c and phase sensitive detectors 81b and 81c to the surface recorder 60 for developing thereon recorder traces 84b and 84c. These latter traces indicate the resistivity variations opposite the pads 16b and 16c in the same manner that the trace 84a indicates the resistivity variation opposite the electrode pad 16a. Phase sensitive detectors 81b and 81c are likewise energized by the actuating phase reference signal supplied by way of conductors 82 and 83.

While the signal generator 75 and the amplifiers 80a–80c and the phase sensitive detectors 81a–81c are shown as being included in the downhole instrument housing 15, it may, in some cases, instead be desirable to locate these circuits or circuits performing a corresponding function at the surface of the earth.

Considering the operation of the apparatus described thus far, as the instrument housing 15 is raised through the borehole 10, the downhole signal generator 75 is energized so as to emit electrical currents from the various surfaces of each of the electrode pads 16a, 16b and 16c as well as from the surfaces of the housing portion 44 and the metal support arms associated with each pad member. As seen in FIG. 8, for the case of the electrode pad 16a this causes a survey current beam $I_s$ to be emitted from the surface portion 29a of the pad member. At the same time, this survey current $I_s$ is constrained to a desired horizontal flow path by the surrounding focussing current $I_f$ emitted from the surface portion 24a of the pad member. Further focussing action is provided by the additional current $I'_f$ which is simultaneously emitted from the conductive surface 44 of the housing 15 and from the conductive surfaces of the metal support arms 40a, 41a, and 42a. Any current emitted from the portion of the conductive surface 44 directly behind the pad member 16a will, of course, pass through the pad member and contribute to the respective survey and focussing currents $I_s$ and $I_f$.

The strong focussing action provided by the emission of focussing current from both the pad member 16a and the conductive surface 44 will cause the survey current beam $I_s$ to penetrate relatively deeply into the adjacent earth formation in front of the pad member 16a. The magnitude of the current flowing in the survey beam $I_s$ will then be determined by the effective conductivities of the various formation regions penetrated by this beam. As the effective conductivity increases the magnitude of survey current flow will likewise increase. An appreciable portion of the electrical resistance experienced by this beam in the earth formations will be contributed by the virgin or uncontaminated portion 86 of the formations even though this zone is spaced from the borehole proper by a mud cake 87 and an invaded zone 88.

Note that the metal pad construction enables both the survey current electrode surface 29a and the focusing current electrode surface 24a to be maintained at substantially the same potential level relative to the current-return electrode B.

The magnitude of the survey current flow $I_s$ is monitored by the toroidal coil 33a, the voltage signal developed in such coil being directly proportional to the magnitude of such current. As shown in FIG. 7, this toroidal coil signal is then amplified in the amplifier 80a and supplied to the phase sensitive detector 81a. This phase sensitive detector, under the control of the actuating signal supplied by way of conductors 82 and 83, serves to detect the 20 kilocycle toroidal coil signal to provide a direct-current output signal which is proportional thereto. This output signal is then transmitted up the cable conductor 61 to the recorder 62 to provide thereon the trace or record 84a. This trace 84a indicates the conductivity variations opposite the survey current electrode surface 29a as the instrument housing 15 is moved through the borehole.

The other electrode pads 16b and 16c operate in a similar manner to develop toroidal coil signals representative of the formation conductivities opposite their survey current electrode surfaces 29b and 29c. The coil signal from the toroidal coil 33b is then supplied by way of amplifier 80b, phase sensitive detector 81b and cable conductor 62 to provide a trace 84b on the recorder 60. Likewise, the coil signal from the toroidal coil 33c is supplied by way of amplifier 80c, phase sensitive detector 81c and cable conductor 63 to provide a trace 84c on the recorder 60.

So long as the boundary planes between different formation layers or strata are perfectly horizontal in nature and the borehole axis is vertical, then the traces 84a–84c recorded by the recorder 60 will usually be identical in appearance. If, however, the electrode pads cross a formation boundary which is at an angle other than 90° relative to the borehole axis, then the conductivity change occurring at the boundary plane will occur at different depth levels for the three electrode pads. The three conductivity traces on the recorder 60 will then be staggered such that a given conductivity variation is indicated as occurring at three different depths for the three electrode pads. The magnitudes of these differences in depths for the same conductivity change may then be used to determine the magnitude of the formation dip angle and the geographical direction of this dip relative to the axis of the borehole 10. This data may then be used together with additional data concerning the inclination or deviation from vertical of the borehole 10 and the direction of such deviation to determine the absolute angle and direction of the boundary plane dip relative to the surface of the earth.

In some cases, it will be desirable to hold the voltage level of each electrode pad constant relative to the current-return electrode B. This may be accomplished by using suitable regulator circuits associated with the signal generator 75. In the case of dipmeter apparatus, however, some variation in the electrode voltage level is tolerable in that the primary item of interest is the relative change in formation resistivity or conductivity occurring at the boundary planes and not the absolute magnitudes of the individual resistivities.

An advantage of the present invention may be seen by considering the presence of the mud cake 87 and the invaded zone 88 shown in the earth formation section of FIG. 8. Such mud cake 87 frequently has a relatively low resistivity while the invaded zone 88 will frequently have a relatively high resistivity compared to the resistivity of the uncontaminated zone 86. In this situation, the localized focussing action provided at the borehole wall by the focussing current emitted from the electrode surface 24a and the electrode edge 25a of the pad member substantially minimizes any tendency of the survey current $I_s$ to be short-circuited by the relatively low resistance mud cake 87. The fact that the edge of the electrode pad is energized by way of the edge electrode surface 25a is particularly helpful in this regard because it minimizes the occurrence of any potential difference effects in the vicinity of the electrode pad which would tend to increase the current flow through the mud cake. This localized focussing action will also be particularly helpful at a boundary between high resistivity and low resistivity formations as it will largely overcome any local distortion of the survey current beam in an effort to flow into the lower resistivity formation.

At the same time, the background focussing action provided by electrically energizing the conductive surface portion 44 of the housing 15 and the surfaces of the support arms and emitting additional focussing current therefrom will assist in getting the survey current beam past the invaded zone 88 so that the resulting measurement will be determined primarily by the resistivity or conductivity of the uncontaminated or virgin zone 86. This prevents further discrepancies from entering into the measurements due to variations in the lateral depth of the invaded zone 88.

Another important feature of the present invention in the case of dipmeter apparatus may be seen by considering the fact that the mud cake on the borehole wall will frequently not have the same thickness on all sides of the borehole. This variation in mud cake thickness in a circumferential direction would tend to introduce erroneous indications into the three recorder traces. With the present invention, however, the survey current flow is relatively insensitive to the mud cake and, hence, relatively insensitive to circumferential variations in the thickness thereof. This leads to a consequent improvement in the accuracy of the dip computations.

Another feature of the present invention is that the strong focussing action which is provided also renders the apparatus less sensitive to variations in the degree of contact between the wall-engaging faces of the pad members and the borehole wall. In other words, no requirement is imposed of having an insulating contact area between the electrode pad and the borehole wall surrounding the survey and focussing current electrode surface portions. This renders the apparatus less sensitive to irregularities in the borehole diameter. Also, the metal pad form of construction provides a more rugged form of electrode pad which is less subject to wear and deterioration.

Referring now to FIGS. 9 and 10 of the drawings, there is shown a modified form of electrode pad 90a which may be used in place of the electrode pad 16a of FIGS. 1 and 7. FIG. 9 shows an elevational view of the wall-engaging face of the pad 90a while FIG. 10 shows a cross-sectional view of the pad 90a. In this embodiment, the focussing current electrode is formed by a metal pad member 91a which forms the major portion of the electrode pad. Electrical connection to the focussing current electrode 91a is made by way of an insulated conductor 92a. Centrally located in the surface of the wall-engaging face of the metal pad member 91a is a recess 93a. A layer of insulating material 94a covers the surface of this recess 93a. The survey current electrode 95a for this embodiment is then located in the recess 93a and separated from the metal pad proper by the insulating material 94a. Electrical connection to the survey current electrode 95a is made by way of an insulated conductor 96a which enters the backside of the metal pad 91a and passes through a cylindrical passageway 97a therein.

Referring now to FIG. 11 of the drawings, there is shown modified electrical circuits which may be used with the electrode pad 90a just described. The electrical circuit portions which correspond to those already discussed in connection with FIG. 7 are given the same reference numerals as used in FIG. 7. For the FIG. 11 circuits, the circuit means for energizing the focussing current electrode 91a includes the signal generator 75, the conductor 76 and the conductor 92a leading to the electrode 91a. The other side of the signal generator 75 output is, as before, connected to a remote current-return electrode B. For this embodiment, the signal generator 75 may be constructed to operate at a lower frequency such as a frequency of 400 cycles per second. The circuit means for energizing the survey current electrode 95a includes the signal generator 75, the conductor 76, a conductor 98a, a transformer 99a having a low impedance primary winding 100a and the conductor 96a leading to the electrode 95a. By means of conductors 92a, 98a and 96a together with the low impedance primary winding 100a, a low impedance interconnection is established between the focussing current electrode 90a and the survey current electrode 95a in order that these two electrodes may operate at substantially the same potential level.

In operation, surveying current is emitted from the surface of the electrode 95a and is caused to penetrate laterally into the adjacent earth formation by the focussing current emitted from the focussing current electrode 91a. As before, additional focussing current may be emitted from the instrument housing conductive surface 44, such surface not being shown in this figure. The total amount of surveying current emitted from the survey current electrode 95a is monitored by the transformer 99a to provide across the secondary winding thereof a voltage signal proportional to such survey current flow. This survey-current representative signal is then supplied to a ratio circuit 101a. There is also supplied to this ratio circuit 101a a voltage signal representative of the voltage difference between the electrode pad 90a and the current-return electrode B. Ratio circuit 101a is responsive to these voltage and current representative signals to develop an output signal corresponding to the ratio thereof, which output signal is, in turn, proportional to the formation resistivity opposite the survey current electrode 95a. This ratio signal is then amplified by an amplifier 102a and transmitted to the recorder at the surface of the earth by way of cable conductor 61. The other side of the amplifier output is connected to the phantom ground-return conductor 85.

Where the electrode pad 90a is used in dipmeter apparatus as illustrated in FIG. 1, two additional electrode pads identical to the electrode pad 90a are also used in place of the electrode pads 16b and 16c of FIG. 1. Similarly, additional output circuits similar to those shown for the electrode pad 90a in FIG. 11 are used for these additional electrode pads.

The emission of focussing current from the edge as well as the wall-engaging face of the electrode pad 90a affords the desired focussing action at the surface of the borehole wall for preventing short-circuiting of the survey current by the low resistivity mud cake, thus rendering the measurement less dependent on the thickness of such mud cake. As before, the use of three electrode pads of this type for dipmeter apparatus makes the dip measurements less subject to errors due to the nonuniformity in the thickness of the mud cake on the various sides of the borehole.

Referring now to FIGS. 12 and 13 of the drawings, there is shown a further embodiment of an electrode pad 105a which may be used in the place of the electrode pad 16a of the FIG. 1 apparatus. The focussing current electrode portion of the electrode pad 105a is formed primarily by a metal pad member 106a which forms the major portion of the structure of the electrode pad 105a. The wall-engaging face of the metal pad 106a has a pair of annular recesses 107a and 108a cut into the wall-engaging face thereof. A first toroidal coil 109a is located in the annular recess 107a, while a second toroidal coil 110a is located in the annular recess 108a. These toroidal coils are retained in place by means of a cover plate 111a and suitable insulation material occupying the remainder of the recess space. The cover plate 111a is in direct electrical contact with the metal pad 106a and, hence, forms the remainder of the focussing current electrode.

It is seen that the recesses in the wall-engaging face of the metal pad 106a, as well as the dimensions of the cover plate 111a, are such as to leave remaining in the central region of the wall-engaging face a pair of electrically-insulated conductive surfaces 113a and 114a. These two conductive surfaces constitute the surface portions of a pair of survey current electrode portions of the metal pad 106a. The horizontal dimension of these surface portions 113a and 114a, i.e., the circumferential dimension at right angles to the longitudinal axis of the borehole when the electrode pad is in use, is elongated so as to be substantially greater in length than the vertical dimension of such surfaces.

Electrical connection to the focussing current electrode portions 106a and 111a is made by way of an insulated conductor 115a. Electrical connection to the leads of the winding of toroidal coil 109a is made by way of a pair of insulated conductors 116a and 117a, while the corresponding electrical connection for the toroidal coil 110a is made by way of a pair of insulated conductors 118a and 119a.

In operation, the signal generator 75 is effective to energize the focussing current electrode 106a by way of the conductor 115a as shown in the circuit diagram of FIG. 14. Because of the direct electrical connection formed between the survey current electrode surfaces 113a and 114a and the focussing current electrode 106a by the interconnecting portions of the metal pad member 106a, the two survey current electrode surfaces 113a and 114a are also energized in the desired manner. Consequently, a pair of survey current beams are emitted from these two surfaces into the adjacent earth formations. These beams are constrained to the desired lateral flow paths by the focussing current emitted from the wall-engaging face and edge of the pad member 105a. As before, additional focussing current may be emitted from the instrument housing conductive surface which, for simplicity, is not shown in FIG. 14.

Each of the toroidal coils 109a and 110a embedded in the metal pad 106a is effective to monitor the current flow emitted from the corresponding one of the electrode surface portions 113a and 114a. These two toroidal coil signals are then supplied to a difference circuit 120a which responds thereto to develop an output signal proportional to the difference between these two survey current signals. So long as the formation resistivities opposite the two survey current electrode surfaces 113a and 114 are identical in value, then the two toroidal coil signals exactly cancel one another in the difference circuit 120a so that zero output signal is developed by such circuit. As the electrode pad 105a crosses a boundary plane between formation regions having different resistivities, however, unequal output signals are developed by the two toroidal coils 109a and 110a. Consequently, the difference signal from the difference circuit 110a will assume a finite value having either a positive or a negative polarity depending on whether the electrode pad 105a is moving from a higher resistivity region to a lower resistivity region or vice versa. The magnitude of this difference signal will be a measure of the resistivity "gradient" or, more accurately, the conductivity "gradient" intermediate the two survey current electrode surfaces 113a and 114a.

This difference signal is then amplified by an amplifier 121a and transmitted to the recorder at the surface by way of the cable conductor 61, the other side of the amplifier output being coupled to the phantom return conductor 85. The resulting recorder trace as the electrode pad 105a moves along the borehole wall will then exhibit pips or deflections whenever the electrode pad 105a crosses the boundary between formation regions having different resistivity values. This provides a somewhat sharper demarcation of the formation boundaries and, hence, may enable a somewhat more accurate determination of the dip angle and direction of the boundary plane in the case where three of these electrode pads are utilized in dipmeter apparatus. As for the earlier embodiments, the emission of focussing current from the edge as well as the wall-engaging face of each electrode pad renders the apparatus less sensitive to the presence and thickness of any mud cake on the borehole wall. Also, for this embodiment, the elongated horizontal dimension of the survey current electrode surface portions 113a and 114a renders the measurement obtained with each pad less sensitive to circumferential variations in mud cake thickness.

Referring now to FIGS. 15 and 16 of the drawings, there is shown a further embodiment of electrode pad 130a which may be used in place of the electrode pad 16a of FIG. 1. In the case of the dipmeter apparatus of FIG. 1, two more electrode pads identical to the pad 130a would be used in place of the other electrode pads 16b and 16c. The focussing current electrode portion of the electrode pad 130a is formed by a metal pad member 131a. The central portion of the wall engaging face of the metal pad 131a, as shown in FIG. 16, is recessed and the interior surfaces of this recessed portion are covered with a layer of insulating material 132a. Inlaid in the insulating material 132a is a pair of survey current electrodes 133a and 134a. These electrodes are, again, elongated in a horizontal direction so as to further minimize the sensitivity of the apparatus to circumferential variations in the mud cake thickness. Electrical connection to the focussing current electrode portion 131a is obtained by means of an insulated conductor 135a, while electrical connection to the survey current electrodes 133a and 134a are obtained by way of insulated conductors 136a and 137a, respectively.

Suitable electrical circuits for use with the electrode pad 130a are shown in FIG. 17 of the drawings. As there shown, the signal generator 75 serves to energize the focussing current electrode portion 131a by way of the conductor 135a. The upper survey current electrode 133a is energized by way of the low impedance primary winding 138a of a transformer 139a and the conductor 136a, while the lower survey current electrode 134a is energized by way of the low impedance primary winding 140a of a transformer 141a and the conductor 137a.

In operation, this connection of the electrodes to the signal generator 75 causes a pair of survey current beams to be emitted by the survey current electrodes 133a and 134a and at the same time causes focussing current to be emitted from the focussing current electrode 131a, the latter serving to direct the two survey current beams laterally into the adjacent earth formation in the desired manner. The magnitudes of the two survey currents are individually monitored by the transformers 139a and 141a so as to develop across the secondary windings thereof a pair of output signals representative of the formation resistivities opposite the two survey current electrodes 133a and 134a. These two resistivity-representative signals are then supplied to a ratio circuit 142a which responds thereto to develop an output signal corresponding to the ratio thereof. This ratio signal is representative of the formation resistivity "gradient" intermediate the two survey current electrodes 133a and 134a. This ratio signal is supplied by way of the cable conductor 61 to the recorder at the surface of the earth, the other side of the ratio circuit output being connected to the phantom ground-return conductor 85.

If the formation resistivities opposite the two survey current electrodes 133a and 134a are identical in value, then the output signal from the ratio circuit 142a will assume a unity reference value. If the formation resistivities are, instead, unequal opposite the two survey current electrodes 133a and 134a, then the output signal from the ratio circuit 142a will either increase or decrease from this unity reference value, depending on whether the electrode pad 130a is moving in the direction of the higher resistivity or the lower resistivity formation. Consequently, pips or deflections in the resultant recorder trace will occur as the electrode pad 130a passes the boundary between earth formation regions having different resistivity values. As before, this will tend to provide a somewhat sharper demarcation of the location of the formation boundary.

The use of a ratio circuit as shown in FIG. 17, as compared to the use of a difference circuit as shown in FIG. 14, has the advantage that the magnitude of the recorder trace deflection will be proportional to the percentage change in formation resistivity values as compared to the absolute change in resistivity values obtained with a difference circuit. In many cases, this provides a better form of recorder presentation which renders the recorder traces somewhat easier to interpret.

From the foregoing descriptions of the various embodiments of the invention, it is seen that apparatus constructed in accordance therewith will, in many cases, provide more accurate indications of the variations in formation resistivities along the course of a borehole drilled into the earth. In particular, such apparatus is particularly well suited for measuring the direction and angle of dip of the boundary planes between adjacent formation regions having different resistivity values.

While there have been described what are at present considered to be the preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. Apparatus for investigating earth formations adjacent a borehole comprising: a pad member having a wall-engaging face which is constructed to slide along the wall of the borehole; means for urging the wall-engaging face of the pad member against the borehole wall; first electrode means for emitting current from the wall-engaging face of the pad member; second electrode means for emitting current from the edge of the pad member; and means electrically interconnecting the electrode means.

2. Apparatus for investigating earth formations adjacent a borehole comprising: a pad member having a wall-engaging face which is constructed to slide along the wall of the borehole; means for urging the wall-engaging face of the pad member against the borehole wall; first electrode means for emitting current from the wall-engaging face of the pad member; second electrode means for emitting current from the backside of the pad member; and means electrically interconnecting the electrode means.

3. Apparatus for investigating earth formations adjacent a borehole comprising: a pad member having a wall-engaging face which is constructed to slide along the wall of the borehole; means for urging the wall-engaging face of the pad member against the borehole wall; first electrode means for emitting current from the wall-engaging face of the pad member; second electrode means for emitting current from the edge of the pad member; third electrode means for emitting current from at least the outer peripheral area of the backside of the pad member; and low impedance means electrically interconnecting the electrode means.

4. Apparatus for investigating earth formations adjacent a borehole comprising: a pad member having a wall-engaging face which is constructed to slide along the wall of the borehole; means for urging the wall-engaging face of the pad member against the borehole wall; first electrode means for emitting current from a centrally-located region of the wall-engaging face of the pad member; and second electrode means for emitting current from the wall-engaging face of the pad member adjacent the centrally-located region and from the edge of the pad member.

5. In apparatus for investigating earth formations traversed by a borehole, the combination comprising: a pad member having a wall-engaging face which is constructed to slide along the wall of the borehole; means for urging the wall-engaging face of the pad member against the borehole wall; and electrode means forming part of the pad member and having a plurality of electrically-interconnected surface portions including a first surface portion located on the wall-engaging face of the pad member and a second surface portion located on the edge of the pad member.

6. In apparatus for investigating earth formations traversed by a borehole, the combination comprising: a pad member having a wall-engaging face which is constructed to slide along the wall of the borehole; means for urging the wall-engaging face of the pad member against the borehole wall; and electrode means forming part of the pad member and having a plurality of electrically-interconnected surface portions including a first surface portion located on the wall-engaging face of the pad member, a second surface portion located on the edge of the pad member and a third surface portion located on the backside of the pad member.

7. In apparatus for investigating earth formations traversed by a borehole, the combination comprising: a pad member having a wall-engaging face which is constructed to slide along the wall of the borehole; means for urging the wall-engaging face of the pad member against the borehole wall; first electrode means forming part of the pad member and having a surface portion centrally located on the wall-engaging face thereof; and second electrode means forming part of the pad member and having a plurality of electrically-interconnected surface portions including a first surface portion located on the wall-engaging face of the pad member and defining a path encircling the surface portion of the first electrode means and a second surface portion forming the edge of the pad member.

8. In apparatus for investigating earth formations traversed by a borehole, the combination comprising: a pad member having a wall-engaging face which is constructed to slide along the wall of the borehole; means for urging the wall-engaging face of the pad member against the borehole wall; and current-conductive means forming part of the pad member and extending from the wall-engaging face to the backside of the pad member and having exposed surface portions on both the wall-engaging face side and the backside of the pad member.

9. In apparatus for investigating earth formations traversed by a borehole, the combination comprising: a pad member having a wall-engaging face which is constructed to slide along the wall of the borehole; means for urging the wall-engaging face of the pad member against the borehole wall; and a conductive electrode member forming part of the pad member and extending from the wall-engaging face to the backside of the pad member and having exposed surface portions on both the wall-engaging face side and the backside of the pad member.

10. In apparatus for investigating earth formations traversed by a borehole, the combination comprising: a pad member adapted to be urged against the borehole wall; current-conductive means forming part of the pad member and extending from the wall-engaging face to the backside of the pad member and having exposed surface portions on both the wall-engaging face side and the backside of the pad member; and a toroidal coil forming part of the pad member and encircling the current-conductive means.

11. In apparatus for investigating earth formations traversed by a borehole, the combination comprising: a pad member adapted to be urged against the borehole wall; a first electrode surface portion forming part of the pad member for emitting current from the wall-engaging face thereof; a second electrode surface portion forming part of the pad member for emitting current from the wall-engaging face thereof adjacent the first electrode surface portion; a third electrode surface portion forming part of the pad member for emitting current from the edge thereof; low impedance means electrically interconnecting the three electrode surface portions for enabling them to operate at substantially the same potential level; and a toroidal coil forming part of the pad member and encircling the portion of the interconnecting means leading to the first electrode surface portion.

12. In apparatus for investigating earth formations traversed by a borehole, the combination comprising: a pad member adapted to be urged against the borehole wall; a first electrode surface portion located on the wall-engaging face of the pad member; a second electrode surface portion located on the wall-engaging face of the pad member adjacent the first electrode surface portion; a third electrode surface portion located on the edge of the pad member; low impedance means forming part of the pad member and electrically interconnecting the three electrode surface portions; and a toroidal coil forming part of the pad member and encircling the portion of the interconnecting means leading to the first electrode surface portion.

13. In apparatus for investigating earth formations traversed by a borehole, the combination comprising: a pad member adapted to be urged against the borehole wall; a first electrode surface portion centrally located on the wall-engaging face of the pad member; a second electrode surface portion located on the wall-engaging face of the pad member and defining a path encircling the first electrode surface portion; a third electrode surface portion located on the edge of the pad member and defining a path encircling the second electrode surface portion; low impedance means forming part of the pad member and electrically interconnecting the three electrode surface portions; and a toroidal coil forming part of the pad member and encircling the portion of the interconnecting means leading to the first electrode surface portion.

14. In apparatus for investigating earth formations traversed by a borehole, the combination comprising: a pad member adapted to be urged against the borehole wall; a first electrode surface portion centrally located on the wall-engaging face of the pad member, this surface portion being elongated in a direction at right angles to the longitudinal axis of the borehole; a second electrode surface portion for emitting current from the wall-engaging face of the pad member adjacent the first electrode surface portion; a third electrode surface portion for emitting current from the edge of the pad member; low impedance means electrically interconnecting the three electrode surface portions for enabling them to operate at substantially the same potential level; and a toroidal coil forming part of the pad member and encircling the portion of the interconnecting means leading to the first electrode surface portion.

15. In apparatus for investigating earth formations traversed by a borehole, the combination comprising: a pad member adapted to be urged against the borehole wall; first and second electrode surface portions centrally located on the wall-engaging face of the pad member and electrically insulated from one another; a third electrode surface portion for emitting current from the wall-engaging face of the pad member adjacent the first and second electrode surface portions; a fourth electrode surface portion for emitting current from the edge of the pad member; low impedance means electrically interconnecting the four electrode surface portions for enabling them to operate at substantially the same potential level; a first toroidal coil forming part of the pad member and encircling the portion of the interconnecting means leading to the first electrode surface portion; and a second toroidal coil forming part of the pad member and encircling the portion of the interconnecting means leading to the second electrode surface portion.

16. In apparatus for investigating earth formations traversed by a borehole, the combination comprising: a pad member adapted to be urged against the borehole wall; a conductive electrode member forming part of the pad member and having first and second portions extending to and forming parts of the wall-engaging surface of the pad member and a third portion extending to and forming at least part of the edge of the pad member; and a toroidal coil forming part of the pad member and encircling the first portion of the electrode member extending to the wall-engaging surface.

17. In apparatus for investigating earth formations traversed by a borehole, the combination comprising: a pad member adapted to be urged against the borehole wall; a conductive electrode member forming part of the pad member and having first and second portions extending to and forming separate portions of the wall-engaging surface of the pad member which are electrically insulated from one another, the first surface portion being centrally located on the wall-engaging face and the second surface portion encircling the first surface portion and extending to and forming the edge of the pad member; and a toroidal coil forming part of the pad member and encircling the first portion of the electrode member extending to the wall-engaging surface.

18. A borehole wall-engaging structure comprising: a wall-engaging metal pad having a recess cut into a central portion of the wall-engaging face thereof; and a toroidal coil located in said recess.

19. A borehole wall-engaging structure comprising: a wall-engaging metal pad having an annular recess cut into a central portion of the wall-engaging face thereof; and an electrically-insulated toroidal coil located in said recess.

20. A borehole wall-engaging structure comprising: a wall-engaging metal pad; and a toroidal coil embedded in the wall-engaging face of the metal pad.

21. A borehole wall-engaging structure comprising: a wall-engaging metal pad; and a pair of toroidal coils embedded in the wall-engaging face of the metal pad.

22. In apparatus for investigating earth formations traversed by a borehole, the combination comprising: a pad member having a wall-engaging face which is constructed to slide along the wall of the borehole; means for urging the wall-engaging face of the pad member against the borehole wall; a first electrode forming part of the wall-engaging face of the pad member; and a second electrode having a first portion forming part of the wall-engaging face and defining a path encircling the first electrode and a second portion forming at least a part of the edge of the pad member.

23. In apparatus for investigating earth formations traversed by a borehole, the combination comprising: a pad member having a wall-engaging face which is constructed to slide along the wall of the borehole; means for urging the wall-engaging face of the pad member against the borehole wall; a first electrode forming part of the wall-engaging face of the pad member; and a second electrode having a first portion forming part of the wall-engaging face and defining a path encircling the first electrode, a second portion forming at least a part of the edge and a third portion forming at least the outer peripheral area of the backside of the pad member.

24. In apparatus for investigating earth formations traversed by a borehole, the combination comprising: a pad member adapted to be urged against the borehole wall; a first electrode forming part of the wall-engaging face of the pad member; and a second electrode electrically insulated from the first electrode and having a first portion forming part of the wall-engaging face and encircling the first electrode and a second portion forming the edge of the pad member.

25. In apparatus for investigating earth formations traversed by a borehole, the combination comprising: a pad member having a wall-engaging face which is constructed to slide along the wall of the borehole; means for urging the wall-engaging face of the pad member against the borehole wall; a first electrode forming a centrally located part of the wall-engaging surface of the pad member, the surface area of this electrode being elongated in a direction at right angles to the longitudinal axis of the borehole; and a second electrode having a first portion forming part of the wall-engaging surface and defining a path encircling the first electrode and a second portion forming at least a part of the edge of the pad member.

26. In apparatus for investigating earth formations traversed by a borehole, the combination comprising: a pad member adapted to be urged against the borehole wall; first and second electrodes centrally located on the wall-engaging face of the pad member and electrically insulated from one another; and a third electrode electrically insulated from the first and second electrodes and having a first portion forming part of the wall-engaging face and a second portion forming at least a part of the edge of the pad member.

27. A borehole wall-engaging structure comprising: a wall-engaging metal pad having a recess cut into a central portion of the wall-engaging face thereof; and an electrode located in the recess and electrically-insulated from the pad proper.

28. A borehole wall-engaging structure comprising: a wall-engaging metal pad having a recess cut into a central portion of the wall-engaging face thereof; a layer of insulating material covering the surface of the recess; and an electrode located in the recess and separated from the pad proper by the insulating material.

29. A borehole wall-engaging structure comprising: a wall-engaging metal pad having a recess cut into a central portion of the wall-engaging face thereof; and a pair of electrodes located in the recess and electrically-insulated from one another and from the pad proper.

30. In apparatus for investigating earth formations traversed by a borehole, the combination comprising: an elongated support member adapted for movement through a borehole; a pad member having a wall-engaging face which is constructed to slide along the wall of the borehole; means for coupling the pad member to the support member and adapted to urge the wall-engaging face of the pad member against the borehole wall; a first electrode forming part of the pad member and having a surface portion centrally located on the wall-engaging face thereof; a second electrode forming part of the pad member and having a first surface portion located on the wall-engaging face and defining a path encircling the surface portion of the first electrode and a second surface portion located on the edge of the pad member; circuit means for energizing the electrodes for emitting electrical currents from the surface portions thereof; and means responsive to the flow of at least one of these currents for providing indications representative of formation resistivity.

31. In apparatus for investigating earth formations traversed by a borehole, the combination comprising: a pad member adapted to be urged against the borehole wall; a first electrode forming part of the pad member and having a surface portion located on the wall-engaging face thereof; a second electrode forming part of the pad member and having a first surface portion located on the wall-engaging face and a second surface portion located on the edge of the pad member; circuit means for energizing the electrodes for emitting electrical currents from the surface portions thereof; a toroidal coil forming part of the pad member and encircling the first electrode for developing a signal representative of the current flow from the surface portion thereof; and means responsive to the coil signal for providing an indication representative of formation resistivity.

32. In apparatus for investigating earth formations traversed by a borehole, the combination comprising: a metal pad adapted to be urged against the borehole wall; a toroidal coil embedded in the wall-engaging face of the metal pad; circuit means for energizing the metal pad for emitting electrical current from the surface portions thereof; and circuit means coupled to the toroidal coil for providing indications representative of formation resistivity.

33. In apparatus for investigating earth formations traversed by a borehole, the combination comprising: a pad member adapted to be urged against the borehole wall; first and second electrodes forming parts of the pad member and each having a surface portion located on the wall-engaging face thereof; a third electrode forming part of the pad member and having a first surface portion located on the wall-engaging face and a second surface portion located on the edge of the pad member; circuit means for energizing the electrodes for emitting electrical currents from the surface portions thereof; a pair of toroidal coils each forming a part of the pad member and individually encircling a different one of the first and second electrodes for developing a signal representative of the current flow from the corresponding surface portion; and means responsive to the two coil signals for providing an indication representative of the formation resistivity gradient intermediate the first and second electrodes.

34. In apparatus for investigating earth formations traversed by a borehole, the combination comprising: a pad member adapted to be urged against the borehole wall; a survey current electrode forming part of the pad member and having a surface portion located on the wall-engaging face thereof; circuit means for energizing the survey current electrode for emitting survey current from the surface portion thereof; a focussing current electrode forming part of the pad member and having a first surface portion located on the wall-engaging face and a second surface portion located on the edge of the pad member; circuit means for energizing the focussing current electrode for emitting focussing current from the surface portions thereof for directing the survey current flow into the adjacent earth formation; and circuit means coupled to the survey current electrode for providing indications representative of formation resistivity.

35. In apparatus for investigating earth formations traversed by a borehole, the combination comprising: a pad member adapted to be urged against the borehole wall; a survey current electrode forming part of the pad member and having a surface portion centrally located on the wall-engaging face thereof; circuit means for energizing the survey current electrode for emitting survey current from the surface portion thereof; a focussing current electrode forming part of the pad member electrically insulated from the survey current electrode and having a surface portion located on the wall-engaging face encircling the survey current electrode and extending to and forming the edge of the pad member; circuit means for energizing the focussing current electrode for emitting focussing current from the surface portions thereof for directing the survey current flow into the adjacent earth formations; and means responsive to the flow of the survey current for providing indications representative of formation resistivity.

36. In apparatus for investigating earth formations traversed by a borehole, the combination comprising: a metal pad adapted to be urged against the borehole wall and having a recess cut into a central portion of the wall-engaging face thereof; an electrode located in the recess and electrically-insulated from the pad proper; circuit means for energizing the electrode for emitting survey current therefrom; circuit means for energizing the metal pad for emitting focussing current from the surface portions thereof for directing the survey current flow into the adjacent earth formation; and means responsive to the flow of the survey current for providing indications representative of formation resistivity.

37. In apparatus for investigating earth formations traversed by a borehole, the combination comprising: a pad member adapted to be urged against the borehole wall; first and second survey current electrodes each forming part of the pad member and having a surface portion centrally located on the wall-engaging face thereof; circuit means for energizing each of the survey current electrodes for emitting survey currents from the surface portions thereof; a focussing current electrode forming part of the pad member and having a first surface portion located on the wall-engaging face and a second surface portion located on the edge of the pad member; circuit means for energizing the focussing current electrode for emitting focussing current from the surface portions thereof for directing the two survey currents into the adjacent earth formations; and circuit means coupled to the two survey current electrodes for providing an indication representative of the formation resistivity gradient intermediate the survey current electrodes.

38. In apparatus for investigating earth formations traversed by a borehole, the combination comprising: an elongated support member adapted for movement through a borehole; a pad member; means for coupling the pad member to the support member and adapted to urge the pad member against the borehole wall; a first electrode forming part of the pad member and having a surface portion located on the wall-engaging face thereof; a second electrode forming part of the pad member and having a first surface portion located on the wall-engaging face and a second surface portion located on the edge of the pad member; at least a portion of the support member located adjacent the pad member having a conductive surface; circuit means for energizing the pad member electrodes and the support member conductive surface for emitting electrical currents from the surface portions thereof; and means responsive to the flow of at least one of these currents for providing indications representative of formation resistivity.

39. In apparatus for investigating earth formations traversed by a borehole, the combination comprising: an elongated support member adapted for movement through a borehole; a pad member; means for coupling the pad member to the support member and adapted to urge the pad member against the borehole wall; current-conductive means forming part of the pad member and extending from the wall-engaging face to the backside of the pad member and having exposed surface portions on both the wall-engaging face side and the backside of the pad member; at least a portion of the support member located adjacent the pad member having a conductive surface; circuit means for energizing the support member conductive surface for emitting electrical current therefrom; and circuit means coupled to the current-conductive means for providing indications representative of formation resistivity.

40. In apparatus for investigating earth formations traversed by a borehole, the combination comprising: an elongated support member adapted for movement through a borehole; a pad member; means for coupling the pad member to the support member and adapted to urge the pad member against the borehole wall; current-conductive means forming part of the pad member and extending from the wall-engaging face of the backside of the pad member and having exposed surface portions on both the wall-engaging face side and the backside of the pad member; a toroidal coil forming part of the pad member and encircling the current-conductive means; at least a portion of the support member located adjacent the pad member having a conductive surface; circuit means for energizing the support member conductive surface for emitting electrical current therefrom; and circuit means coupled to the toroidal coil for providing indications representative of formation resistivity.

41. In apparatus for investigating earth formations traversed by a borehole, the combination comprising: an elongated support member adapted for movement through a borehole; a pad member; metal support means for coupling the pad member to the support member and adapted to urge the pad member against the borehole wall; a first electrode forming part of the pad member and having a surface portion located on the wall-engaging face thereof; a second electrode forming part of the pad member and having a first surface portion located on the wall-engaging face and a second surface portion located on the edge of the pad member; at least a portion of the support member located adjacent the pad member having a conductive surface; circuit means for energizing the pad member electrodes, the support member conductive surface and the metal support means for emitting electrical currents from surface portions thereof; and means responsive to the flow of at least one of these currents for providing indications representative of formation resistivity.

42. Dipmeter apparatus for investigating the dip angle of boundaries between earth formation regions traversed by a borehole comprising: three pad members; means for moving the three pad members in unison through the borehole and for urging them against the borehole wall at three angularly spaced apart locations around the circumference of the borehole; each pad member having a first electrode forming part of the pad member and having a surface portion located on the wall-engaging face thereof; each pad member having a second electrode forming part of the pad member and having a first surface portion located on the wall-engaging face and a second surface portion located on the edge of the pad member; circuit means for energizing the electrodes of each pad member for emitting electrical currents from the surface portions thereof; and means separately responsive to the flow of at least one of the currents from each pad member for providing indications representative of the formation resistivities in three different directions from the borehole axis.

43. Dipmeter apparatus for investigating the dip angle of boundaries between earth formation regions traversed by a borehole comprising: three pad members; means for moving the three pad members in unison through the borehole and for urging them against the borehole wall at three angularly spaced apart locations around the circumference of the borehole; each pad member having first and second electrodes each forming part of the pad member and having a surface portion located on the wall-engaging face thereof; each pad member having a third electrode forming part of the pad member and having a first surface portion located on the wall-engaging face and a second surface portion located on the edge of the pad member; circuit means for energizing the electrodes of each pad member for emitting electrical currents from the surface portions thereof; and means separately responsive to the flow of currents from the first and second electrodes of each pad member for providing indications representative of the formation resistivity gradients intermediate the first and second electrodes of each pad member.

44. Dipmeter apparatus for investigating the dip angle of boundaries between earth formation regions traversed by a borehole comprising: an elongated support member adapted for movement through a borehole; three pad members; means for coupling each pad member to the support member for movement in unison through the borehole and for urging the pad members against the borehole wall at three angularly spaced apart locations around the circumference of the borehole; each pad member having a first electrode forming part of the pad member and having a surface portion located on the wall-engaging face thereof; each pad member having a second electrode forming part of the pad member and having a first surface portion located on the wall-engaging face and a second surface portion located on the edge of the pad member; at least a portion of the support member located adjacent the pad member having a conductive surface; circuit means for energizing the electrodes of each pad member and the conductive surface of the support member for emitting electrical currents from the surface portions thereof; and means separately responsive to the flow of at least one of the currents from each pad member for providing indications representative of the formation resistivities in three different directions from the borehole axis.

References Cited in the file of this patent

UNITED STATES PATENTS

| | | |
|---|---|---|
| 2,427,950 | Doll | Sept. 23, 1947 |
| 2,621,232 | Spalding | Dec. 9, 1952 |
| 2,626,305 | Krueger | Jan. 20, 1953 |
| 2,669,688 | Doll | Feb. 16, 1954 |
| 2,712,629 | Doll | July 5, 1955 |
| 2,803,796 | Schuster | Aug. 20, 1957 |
| 2,806,201 | Schuster | Sept. 10, 1957 |
| 2,813,248 | Ferre | Nov. 12, 1957 |
| 2,876,413 | Saurenman et al. | Mar. 3, 1959 |
| 2,884,590 | Welz | Apr. 28, 1959 |
| 2,916,691 | Owen | Dec. 8, 1959 |
| 2,917,704 | Arps | Dec. 15, 1959 |